United States Patent
Garney et al.

(10) Patent No.: US 6,675,325 B1
(45) Date of Patent: Jan. 6, 2004

(54) METHOD AND APPARATUS FOR FAULT ANALYSIS IN A COMMUNICATION NETWORK

(75) Inventors: David J. Garney, Glen Ellyn, IL (US); David R. Smith, New Albany, OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/415,970

(22) Filed: Oct. 12, 1999

(51) Int. Cl.[7] .................................................. H02H 3/05
(52) U.S. Cl. ...................................... 714/43; 379/14.01
(58) Field of Search .............................. 714/43, 44, 45, 714/56; 379/2, 14.01, 16

(56) References Cited

U.S. PATENT DOCUMENTS

| | | | |
|---|---|---|---|
| 4,713,810 A | * 12/1987 | Chum | 370/243 |
| 5,960,411 A | * 9/1999 | Hartman et al. | 345/962 |
| 5,987,116 A | * 11/1999 | Petrunka et al. | 379/211.02 |
| 6,021,176 A | * 2/2000 | McKendry et al. | 379/35 |
| 6,226,375 B1 | * 5/2001 | Shaffer et al. | 379/142.17 |
| 6,304,982 B1 | * 10/2001 | Mongan et al. | 714/26 |
| 6,385,298 B1 | * 5/2002 | Beyda et al. | 379/1.01 |

* cited by examiner

*Primary Examiner*—Dieu-Minh Le

(57) ABSTRACT

A communication network includes a customer database storing information including a customer identifier and an associated plurality of telephone numbers. The customer database preferably is in communication with both a circuit switch component and a packet switch component using a first protocol. The switch components are further in communication with an error collection computer using a variety of unique protocols. Upon the occurrence of an error in the network, the switch component provides an error message to the error collection computer for analysis. An interconnecting datalink is also provided between the customer database and the error collection computer communicating using a second protocol. This interconnecting datalink allows additional information to be passed without changing the SS7 protocol or the variety of unique protocols from each of the network components. When the error collection computer receives a calling number and/or a called number in the error message, the error collection computer cross-references those numbers against those contained in a database downloaded over the interconnecting datalink to determine if any selected customers are impacted by the error. If so, the error collection computer outputs its analysis including the customer identifier.

11 Claims, 2 Drawing Sheets

*FIG. 3*

| LUCENT TECHNOLOGIES | 8002422121 |
|  | 8008222000 |
|  | 8002477000 |
|  | 8006282888 |
| LUCHITAS | 8006964040 |
|  | 8002521169 |

50, 52, 54

METHOD AND APPARATUS FOR FAULT ANALYSIS IN A COMMUNICATION NETWORK

BACKGROUND OF THE PRESENT INVENTION

The present invention relates to the analysis of fault information generated by circuit switch components and/or packet switch components.

Today, many businesses rely on a high volume of completed telephone calls to generate sales or revenue. When telephone service is interrupted, business is lost. In a circuit switch telephone network, large numbers of calls are connected every day through computerized switches as are known in the art. Occasionally, errors occur in making this connection. When these errors do occur, error messages are generated typically by the circuit switch components themselves, and sent to a common location for example, an error collection computer such as the NetMinder® System utilizing Network Trouble Patterning (NTP) manufactured by Lucent Technologies. Typically, the error collection computers collect and correlate error messages generated by the circuit switch components during call setup. This data is used to deduce the status of wireline, wireless, and Signaling System 7 (SS7) networks through extensive statistical and patterning analysis. This analysis process automatically determines network trouble patterns and produces near real time alerts. The NetMinder® system, for example, provides surveillance capability at the network architecture level and allows for a comprehensive view of services across multiple network elements.

Unfortunately, the error messages contain only information available to the circuit switch components. As illustrated in FIG. 1, typically these error messages 4, defined by the SS7 protocol, include the telephone number from which the call originates or "calling number" 6, and the desired telephone number which the calling party wishes to reach or "called number" 8. Notably absent in the SS7 message is an indication of additional identifying information about the customer affected by the error, such as a corporate name. In the recent past, the lack of customer identifier data in the error messages 4 caused few problems because telephone customers typically had few telephone numbers often having similar attributes. However, the lack of identifying data has become increasingly problematic when a customer has many different telephone numbers, because the error collection computer's analysis is typically focused on dialed telephone numbers. As an extreme example, if every telephone number of a company fails once, thousands of telephone calls may be lost. Yet, the error collection computer may fail to appreciate the loss, and alert repair personnel, because one lost call to one telephone number may not be sufficient to trigger alerts.

Accordingly, it would be desirable for the error collection computer to associate additional customer identifier information with the error messages generated and analyzed. This would allow technicians to focus their repair activities on customers that depend most heavily on uninterrupted telephone service.

In conventional circuit switch telephone networks, a database presently exists containing, among other items, associations of customer identifiers and a plurality of assigned telephone numbers. For example, a large catalogue company may have several thousand "800 numbers" across the country which are different. These numbers can all be associated with one common customer identifier and receive the same processing treatment and billing. Usually, details about these businesses including their names, billing information, and the plurality of telephone numbers are maintained in a Switch Control Point (SCP) within the network. Because the data in the SCP is maintained both to provide functionality and for billing purposes, the information is generally accurate. Various manufacturers commercially produce SCP's which are capable of converting the thousands of numbers dialed to a specific customer ID. Typically, SCP's are physically separate, perhaps by large distances, from other components in the network such as switches and error collection computers. All calls to a specific customer ID then receive, for example, the same recorded announcements, the same recorded message prompts for digit options, final routing to a common bank of telephones or operator stations, and the like.

Currently, additional information may be transferred from the SCP to the Error Collection Computer (ECC) by changing the processing logic in each of the Switch Components. For example the SCP can send additional customer feature information by extending the SS7 message over the network links; and each unique Switch Component can be changed to pass this additional information over the unique error message links to the Error Collection Computer. In this situation, the SCP, ECC and many Switch Components would need to have new message processing logic installed. Often there are several SCPs in a network and many Switch Components from various manufacturing companies. For the Service Provider Company, this can be time consuming, difficult to coordinate, has a potential of being changed incorrectly and can be a very costly change.

A multi-media communication network using packet switch componentry can also adhere to the SS7 protocol and employ an error collection computer and an SCP. Unfortunately, such a packet switch network suffers from the drawbacks outlined above.

The present invention contemplates a new and improved method and apparatus for fault or error analysis in a multi-media communication network which overcomes the above-referenced problem and others.

BRIEF SUMMARY OF THE INVENTION

The above problems are alleviated and an advance is made over the prior art in accordance with the teachings of Applicant's invention wherein, a communication network includes a customer database storing customer information. The network further includes an error collection computer which receives and analyzes error messages relating to the network and an interconnecting datalink provides data communication between the customer database and the error collection computer.

In accordance with another aspect of the present invention, the communication network further includes a switch component which provides error messages to the error collection computer when errors are encountered.

In accordance with another aspect of the present invention, the switch component includes a circuit switch component and/or a packet switch component.

In accordance with another aspect of the present invention, the error message includes at least one of a calling number or a called number.

In accordance with another aspect of the present invention, the error collection computer selects a customer identifier based on matching at least one of the calling number or called number from the error message with the telephone number from the customer database. The network further includes an output device which outputs error information including the selected customer identifier.

In accordance with another aspect of the present invention, the switch component communicates with the error collection computer according to a first protocol, and the customer database communicates with the error collection computer over the interconnecting datalink according to a second protocol.

In accordance with another embodiment of the present invention, a method of recognizing impaired customer performance in a multi-media network includes receiving an error message generated in response to an error, an receiving customer information from a customer database. From these a customer identifier is determined.

In accordance with another aspect of the present invention, a method further includes outputting error data including the customer identifier.

In accordance with another aspect of the present invention, where the error message includes at least one of a calling number or a called number the receiving customer information step includes responsive to receipt of the error message, requesting customer information including a customer identifier associated with at least one of the calling number or called number.

In accordance with another aspect of the present invention, the receiving customer information step includes at selected times, downloading selected customer information including a customer identifier and at least one telephone number associated with the customer identifier.

In accordance with another aspect of the present invention, where the error message includes at least one of the calling number and the called number, the determining a customer identifier step includes selecting a customer identifier associated with a telephone number matching at least one of the calling number and the called number.

In accordance with another aspect of the present invention, the method further includes generating an error message according to a first protocol upon a failure to successfully route a call in either a circuit switched network or a packet switched network.

In accordance with another aspect of the present invention, the method further includes at selected times, generating selected customer information according to a second protocol, and sending the selected customer information.

In accordance with another embodiment of the present invention, in a network including a switching component for routing a call between a calling number and a called number and generating a error messages upon a failure to route the call, a method of determining a customer impacted by the failure includes receiving a customer identifier and a plurality of telephone numbers associated with the customer identifier. Either of the calling number and the called number are then matched with one of the received are then matched with one of the received plurality of telephone numbers and a customer identifier is selected associated with the matched number.

In accordance with another aspect of the present invention, the receiving customer identifier step includes downloading selected customer information to a database.

In accordance with another aspect of the present invention where the switching component communicates error messages in accordance with a defined protocol, the receiving step includes in other than the defined protocol, receiving the customer identifier, and the plurality of telephone numbers associated with the customer identifier.

One advantage of the present invention is the ability to quickly discern errors affecting a monitored customer.

Another advantage of the present invention is the provision of identifying data to an Error Collection Computer without the need to modify the Signaling System 7 (SS7) protocol.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF THE PREFERRED EMBODIMENTS

Figure 2:
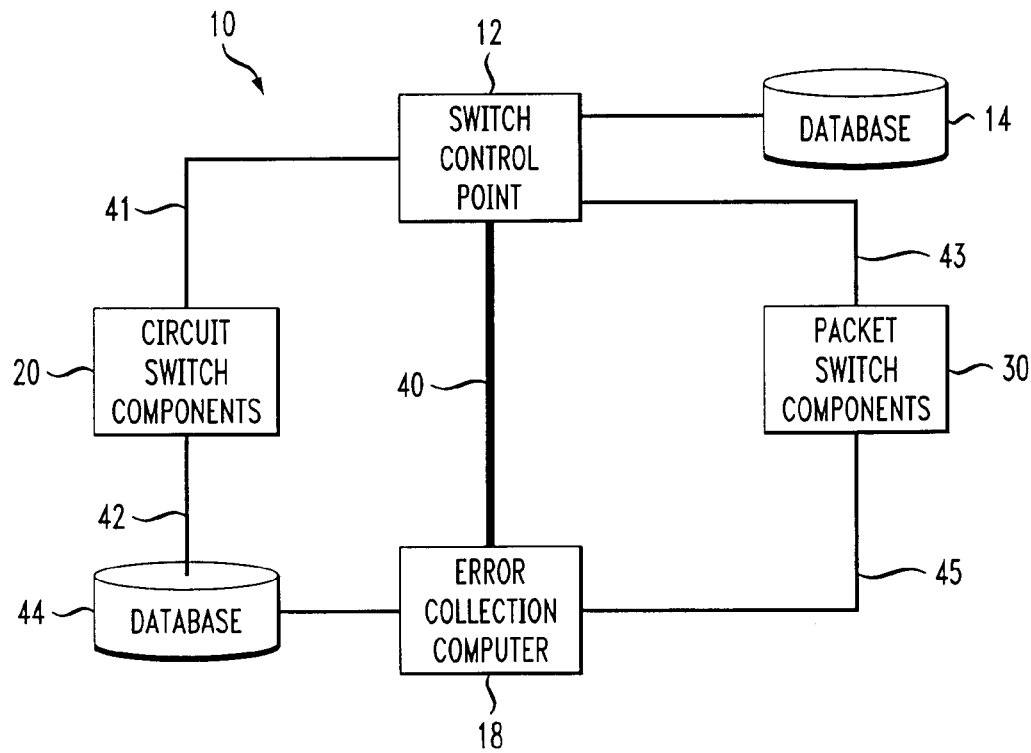
FIG. 2 is a diagrammatic illustration of a communication network in accordance with the present invention; and, FIG. 3 is an exemplary illustration of data provided from the SCP to the error collection computer.

With reference to FIG. 2, a communication network 10 includes a switch control point (SCP) 12 which includes a database 14 containing customer identifiers, telephone numbers and billing information of a number of customers of the network. The network 10 also includes circuit switch componentry 20, such as the 5ESS®, or 4ESS® manufactured by Lucent Technologies. This circuit switch componentry is in data communication with the SCP 12 over a data link operating under Signaling System 7 (SS7) protocol. Additionally, the network 10 includes an error collection computer (ECC) 18, such as the NetMinder® system also manufactured by Lucent Technologies. The ECC 18 typically receives error message from the circuit switch componentry 20 which include message parameters from the SS7 protocol. The ECC 18 analyzes the errors according to the switch component's unique error message protocol to find faults including routing errors, logical network errors or software bugs, trunk and facility troubles and the like. Network analysts then examine an output of the ECC 18 to prioritize repair efforts on network components and/or reroute communications around error prone components.

The network 10 also preferably includes packet switch componentry 30 which includes routers, feature or element managers, a voice gateway, a control gateway and the like. The packet switch componentry 30 preferably enables voice over packet communication via TCP/IP and/or Asynchronous Transfer Mode (ATM) network communications. A packet switch component 30 preferably communicates with the SCP 12 for control and routing information. Packet Switch components have their error information transmitted to the Error Collection Computer 18 using the component, or component manager's, unique error message protocol. The packet switch componentry 30 can include components such as Lucent Technologies 7R/E™ Portfolio of products in conjunction with a One Link network management system and individual Element Management System (EMS) products.

The network 10 also includes a datalink 40 which preferably provides a dedicated communications path between the SCP 12 and the ECC 18. In one presently preferred embodiment, customer information from the SCP 12, including customer identifiers and associated telephone numbers, is transmitted periodically over the data link 40 to the ECC 18 for local storage in a database 44. Those skilled in the art can appreciate that the customer information may be transferred once a day during non-peak or non-network intensive times. In addition, the information that is passed to the Error Correction Computer 18 may consist of a variety of numeric and/or symbolic information in order to help the maintenance personnel maintain the multi-media network. For example, the calling and called numbers in the North American dialing plan and the letters of the customer's corporate name may be passed. Also, there may be passed Internet Protocol (IP) numeric addresses, temporary IP numeric addresses and symbolic addresses such as member@aol.com, URL-www information such as http://www.lucent.com, and other like information. Alternately, since the datalink 40 is preferably a dedicated line, customer information can be continuously downloaded upon a change in customer information in the SCP 12 or as otherwise required.

The network 10 may alternately include a data link 40 which may provide a dial-up communication path. This path may be facilitated through the circuit switched or packet switched network. This embodiment can be less costly and more reliable than a dedicated datalink 40. Network planners skilled in the art are able to determine the need for duplicated routes and other factors.

Using the usually off-site SCP 12 for customer information is desirable because the SCP 12 has a greater likelihood of containing correct information. Accurate data in the SCP 12 is required for proper operation of the network and to generate accurate billing data. Moreover, the likelihood of accurate information contained in the SCP 12, thus in the database 44, is increased because administrative or billing personnel are typically employed to maintain the data contained in the SCP 12. The customer information contained in database 44 enables the ECC 18 to associate error reports with a customer identifier, group error reports based on the identity of the customer experiencing the faulty service and/or prioritize error reports based on the vulnerability of a customer to interrupted telephone service. An analyst reviewing the output data from the ECC 18 may then dispatched repair personnel or may employ other efforts to correct the anomaly. The present invention envisions batch downloads to the ECC database 44 occurring during off peak hours on at least the customers most vulnerable to service interruptions.

In an alternate embodiment, at least a customer identifier from the SCP 12 is transmitted in real time as error messages are received by the ECC 18. In this embodiment, upon receiving an error message, the ECC 18 preferably forwards or otherwise provides both the calling and called numbers over the datalink 40 to the SCP 12. The SCP 12, modified in known ways to perform a simple search, determines and returns over the datalink 40 customer information including the customer identifier to the ECC 18. Once provided with customer identifier data, the ECC analyzes the errors as discussed above.

Those skilled in the art will recognize that the datalink 40 can also operate through the traditional network switching components 20, 30. In this embodiment, customer identifying data may be appended to messages formatted in the SS7 protocol and transmittable over links 42, 45. For example, in this embodiment, a switch 20, could be programmed to access the SCP 12 upon each attempt to route a call between a calling number and a called number. In the event that an error is detected, the customer identity data, known to the switch in this embodiment, is forwarded to the ECC 18 with the error message over the unique, non SS7 protocol link 42. Artisans will recognize that such a datalink likely necessitates amending the SS7 protocol on network components worldwide. In addition to update expenses, the longer SS7 messages and need to download data from the SCP 12 to route each call, also have network timing and efficiency costs.

Still referring to FIG. 2, the data link 40 also provides benefits to the packet switch componentry 30 side of the network 10. Routers and other packet componentry also occasionally fail to deliver packets due to errors. Error messages are generated, filtered, and provided to the ECC 18. The present invention envisions a common ECC 18 providing statistical analysis and historical data for both circuit switch componentry 20, and the packet switch componentry 30. The presence of the preferably dedicated datalink 40, eliminates the need for extra customer data or information to be sent over the SS7 protocol messages as errors are generated. This desirably eliminates the need to modify the existing fields within the protocol. Also, as above, the vulnerable customer data from the SCP 12, downloaded to database 44, is likely to be the most accurate information available.

Figure 1:
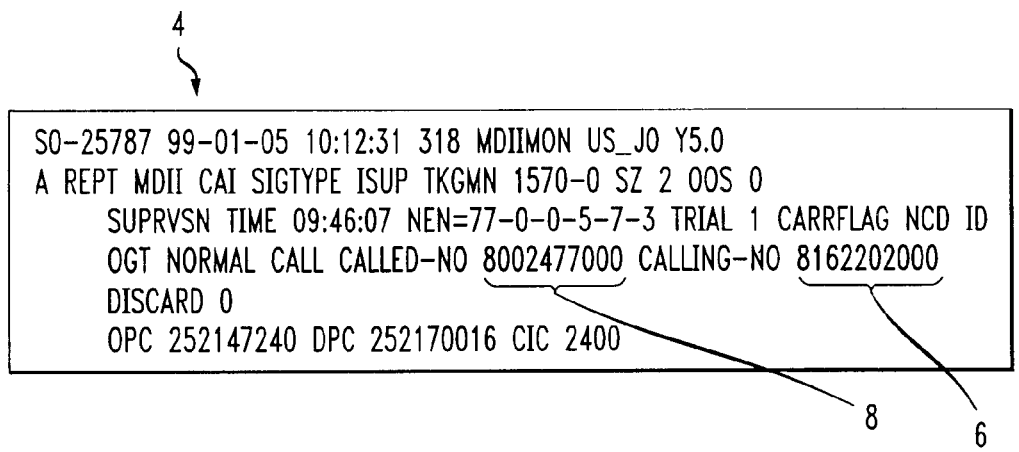
FIG. 1 is an exemplary illustration of an error message generated by a switch component.

Referring now to FIG. 3, the database 44 is periodically provided with updated customer information 50. This customer information 50 includes an association of a telephone number 52 and the alphanumeric identifier 54 or name or other customer code number to identify the customer. Accordingly, the ECC 18 when performing its analysis, dips into database 44 upon receipt of an error message 4. If a match between either the called number 8 or the calling number 6 (FIG. 1) exists with the customer phone number 52, the output of the analysis performed by the ECC 18 will include the alphabetic name or customer identifier 54 associated with the customer. In addition to the customer name in FIG. 3, information regarding error limits, priority, features, quality of service information and the like may be transmitted as appropriate to speedily handle a network fault.

The invention has been described with reference to the preferred embodiments. Obviously modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A communication network including:
    a customer database storing customer information comprising a customer identifier and at least one telephone number associated with the customer identifier;
    an error collection computer receiving and analyzing error messages relating to the network; and,
    an interconnecting datalink providing data communication between the customer database and the error collection computer.

2. The communication network as set forth in claim 1, further including:
    a switch component in data communication with the error collection computer, said switch component providing an error message to the error collection computer upon the occurrence of an error.

3. The communication network as set forth in claim 2, wherein the switch component comprises a circuit switch component.

4. The communication network as set forth in claim 2, wherein the switch component comprises a packet switch component.

5. The communication network as set forth in claim 2, wherein the error message includes at least one of a calling number and a called number.

6. The communication network as set forth in claim 5, where the error collection computer selects a customer identifier based on matching at least one of the calling number and the called number from the error message with the telephone number from the customer database, the network further comprising:

an output device which outputs error information including the selected customer identifier.

7. The communication network as set forth in claim 2, wherein the switch component communicates with the error collection computer according to a first protocol, and the interconnecting datalink communicates according to a second protocol.

8. In a communication network comprising, a switching component for routing information between a calling number and a called number and generating error messages upon a failure to route said information; and an error collection computer for receiving the error messages including the calling number and the called number, a method of determining a customer impacted by the failure comprising:

receiving a customer identifier, and a plurality of telephone numbers associated with the customer identifier;

matching either of the calling number and the called number with one of the received plurality of telephone numbers; and, selecting the customer identifier associated with the matched number.

9. The method as set forth in claim 8, further comprising outputting data including the selected customer identifier as the customer determined to be impacted by the failure.

10. The method as set forth in claim 8, wherein the receiving step comprises:

downloading selected customer information to a database.

11. The method as set fort in claim 8, wherein the switching component communicates error messages in accordance with a defined protocol and the receiving step comprises:

in other than the defined protocol, receiving the customer identifier, and the plurality of telephone numbers associated with the customer identifier.

* * * * *